US009733818B2

(12) United States Patent
Chai et al.

(10) Patent No.: US 9,733,818 B2
(45) Date of Patent: Aug. 15, 2017

(54) COMMITMENT-BASED GUI IN THE CONTEXT OF MEDIA AND ENTERTAINMENT

(75) Inventors: Crx K. Chai, Oakland, CA (US); Alex Fishman, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 1577 days.

(21) Appl. No.: 12/283,427

(22) Filed: Sep. 11, 2008

(65) Prior Publication Data
US 2010/0058224 A1   Mar. 4, 2010

Related U.S. Application Data

(60) Provisional application No. 61/190,224, filed on Aug. 26, 2008.

(51) Int. Cl.
G06F 3/0482 (2013.01)
G06F 3/0481 (2013.01)
G06F 3/0485 (2013.01)

(52) U.S. Cl.
CPC .......... *G06F 3/0485* (2013.01); *G06F 3/0481* (2013.01); *G06F 3/0482* (2013.01); *G06F 2203/04804* (2013.01)

(58) Field of Classification Search
None
See application file for complete search history.

(56) References Cited

U.S. PATENT DOCUMENTS

| | | | | |
|---|---|---|---|---|
| 5,263,560 | A | * | 11/1993 | Bayer .......................... 188/380 |
| 5,995,101 | A | * | 11/1999 | Clark et al. ................... 715/711 |
| 6,121,968 | A | * | 9/2000 | Arcuri et al. ................. 715/825 |
| 6,707,449 | B2 | * | 3/2004 | Hinckley et al. ............. 345/173 |

(Continued)

FOREIGN PATENT DOCUMENTS

WO   WO-2010025168 A1   3/2010

OTHER PUBLICATIONS

"Integrated Design of Intelligent Surveillance Systems and their User Interface" by Alexander Toet, 2005 International Conference on Artificial Intelligence.*

(Continued)

*Primary Examiner* — Jeffrey A Gaffin
*Assistant Examiner* — Paul Thatcher
(74) *Attorney, Agent, or Firm* — Schwegman Lundberg & Woessner, P.A.

(57) ABSTRACT

A commitment-based GUI is provided. In one example embodiment, a system to provide commitment-based GUI comprises a menu activation module, an actions monitor, a commitment detector, and a presentation control module. The menu activation module may be configured to activate a multi-panel media interface on a display device, the multi-panel media interface presenting one or more menu panels. The actions monitor may be configured to monitor activity of a user with respect to the multi-panel media interface. The commitment detector may be configured to determine a commitment level of the user, the commitment level indicating the user's interest level in navigating a menu structure associated with the multi-panel media interface. The presentation control module may be configured to adjust presentation of the multi-panel media interface based on the determined commitment level.

22 Claims, 9 Drawing Sheets

(56) References Cited

U.S. PATENT DOCUMENTS

| | | | |
|---|---|---|---|
| 7,312,785 B2 | 12/2007 | Tsuk et al. | |
| 2003/0112467 A1 | 6/2003 | McCollum et al. | |
| 2003/0237043 A1* | 12/2003 | Novak et al. | 715/500.1 |
| 2004/0075693 A1* | 4/2004 | Moyer | G06F 3/0482 |
| | | | 715/810 |
| 2005/0057498 A1* | 3/2005 | Gentle | G06F 9/4446 |
| | | | 345/157 |
| 2005/0114778 A1* | 5/2005 | Branson et al. | 715/711 |
| 2007/0028270 A1* | 2/2007 | Ostojic et al. | 725/53 |
| 2008/0244398 A1* | 10/2008 | Santos-Gomez et al. | 715/708 |
| 2009/0219304 A1* | 9/2009 | Martin et al. | 345/684 |

OTHER PUBLICATIONS

Carl Gutwin et al., "The Effects of Dynamic Transparency on Targeting Performance".*

"International Application Serial No. PCT/US2009/055005, Search Report mailed Oct. 22, 2009", 4 pgs.

"International Application Serial No. PCT/US2009/055005, Written Opinion mailed Oct. 22, 2009", 5 pgs.

"International Application Serial No. PCT/US2009/055005, International Preliminary Report on Patentability mailed Mar. 10, 2011", 7 pgs.

* cited by examiner

COMMITMENT-BASED GUI IN THE CONTEXT OF MEDIA AND ENTERTAINMENT

RELATED APPLICATIONS

This patent application claims the benefit of priority, under 35 Section 119(e), to U.S. Provisional Patent Application Ser. No. 61/190,224, filed on Aug. 26, 2008, entitled COMMITMENT-BASED GUI, by inventors Alex Fishman and Crx K. Chai, which application is incorporated herein by reference in its entirety.

TECHNICAL FIELD

This application relates to the fields of media and entertainment and specifically to commitment-based graphical user interface (GUI).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
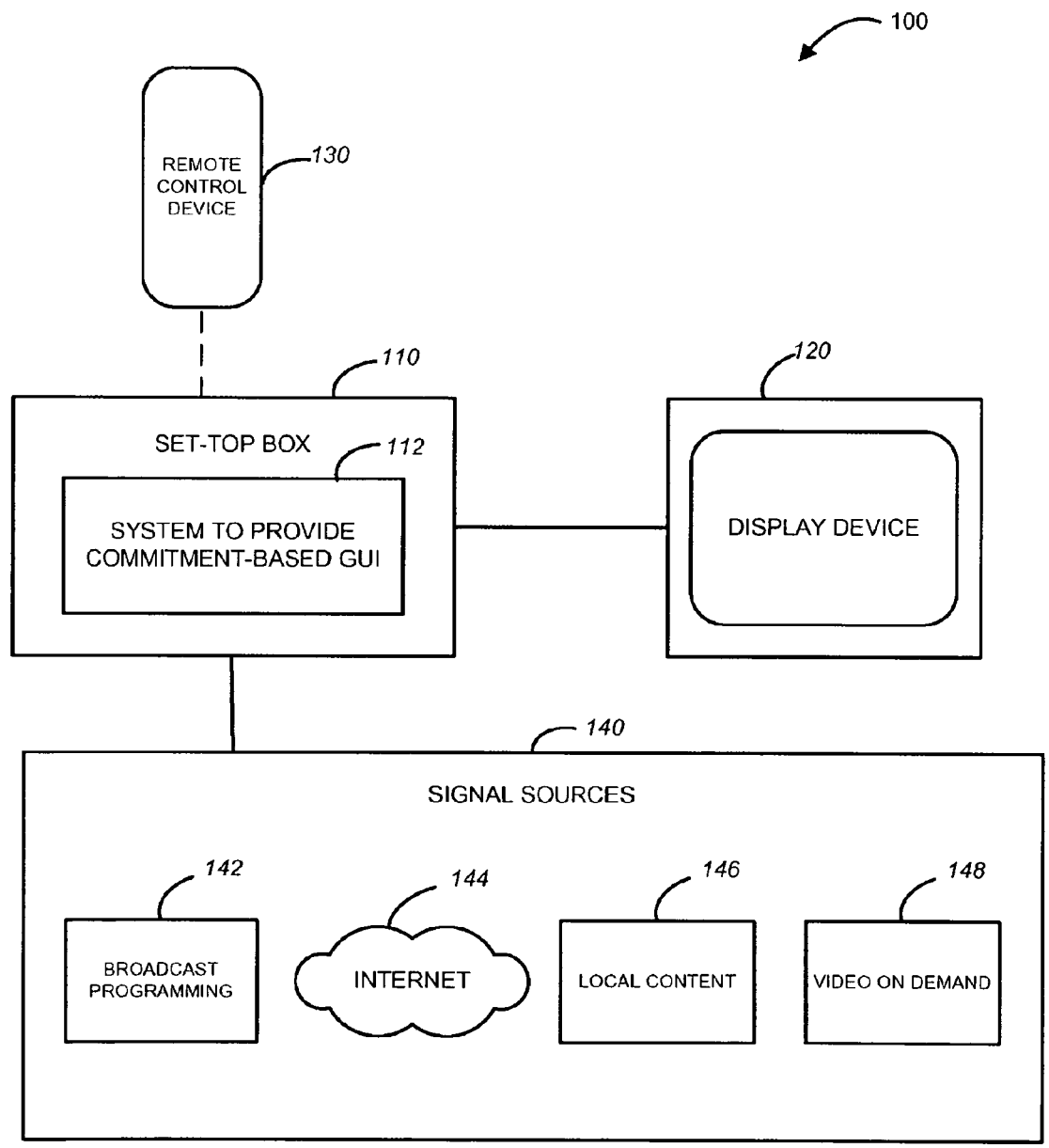
FIG. 1 illustrates an environment within which an example commitment-based GUI may be implemented, in accordance with an example embodiment.

A commitment-based GUI is a next generation unified media interface that may be configured to permit users to quickly and easily access content. It may also be configured as a community focused media viewing environment, that enables users to open up their virtual living room to others and thus expand their media universe. A commitment-based GUI is a menu structure that comprises a number of menu panels that are made accessible to a user as the user explores various menu options. A menu is a component of a user interface that allows the user to make selections and choices from a list (e.g., a preset list or a list generated on the fly based on broadcast information, user preferences, etc.).

The multi-panel menu, in one example embodiment, originates in the left hand margin of the viewer's screen. It may be activated by a user, e.g., by using the right arrow key or some other particular key on a remote control device. As the user navigates deeper into the menu structure, additional information is progressively revealed based on the commitment metrics of the user. Commitment metrics of the user provide an indication of how committed the user is to navigating the menu rather than to watching currently displayed content (referred to as the main content). It will be noted that the term "navigating," when used with respect to the multi-panel media interface, includes viewing a panel that is part of the multi-panel media interface. For example, a hover panes may be presented to a viewer automatically and may not include any selectable choices. Commitment-based GUI presents a visual representation of the user's commitment. For example, each next layer in the menu structure may take up a larger portion of the display area because the example commitment-based GUI may make an assumption that the user who continues navigating the menu structure is less interested in what she is currently watching and more interested in the menu content. In order to provide an indication of how deep the user is in the menu structure, the commitment-based GUI may utilize various visual representation techniques, such as, e.g., shading. In one embodiment, the color of the menu items becomes darker as the user navigates deeper into the menu.

Example commitment-based GUI is designed to interfere as little as possible with viewing of the main content on one hand and to encourage interaction in an intuitive and consistent manner. For example, while watching television, a user may wish to access a digital photograph stored on the user's personal computer (PC), a song stored on the user's universal serial bus (USB) device, or a clip available via the Internet. Commitment-based GUI may be configured to consolidate various types of media available for access via an STB and to group the available media by content type so that a user can access all of her media content via the example commitment-based interface.

Some example features of the commitment-based GUI include personalization, consistent navigation, and center focus. Personalization may include utilizing users' profiles to adjust presentation of the menus to align it with the needs and preferences of individual users. Consistent navigation may be described as a feature where activating the left arrow key or some other particular key on a remote control device causes navigating back one level in the menu structure and activating the right arrow key or some different particular key on the remote control device causes navigating forward one level in the menu structure. Center focus is a feature where the menu focus is always positioned vertically centered on the screen to make it easier for a user to follow content as the user navigates the menu structure.

Other features may include persistent focus, hover focus, throttled list scrolling, and an action panel. Once the multi panel media interface is activated, the focus color or shape follows the focus from level to level. The focus is fluid, which makes it easier for a user to follow menu selections and the associated content content. In one example embodiment, focus persists in the form of a white colored bar. A hover focus is a way to provide a user with a preview of a next menu panel. In one embodiment, commitment-based GUI uses a time-based auto preview mechanism. For example, if a user stays on a menu item for a certain duration of time (e.g., 3 seconds), the user is presented with a preview in the form of a hover focus. Examples of a hover focus are discussed with reference to FIGS. 4-8.

Figure 6:
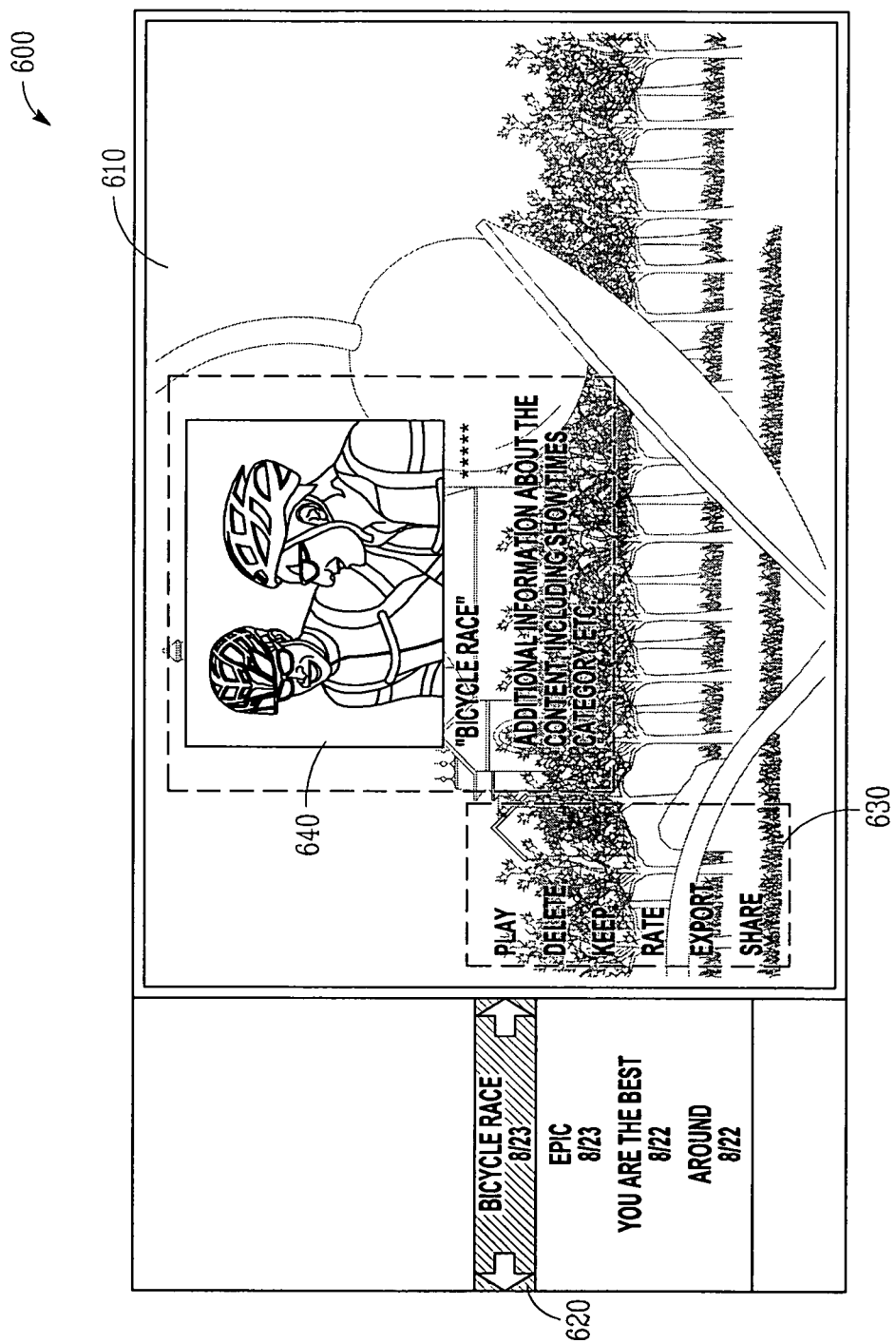

Throttled list scrolling is a way to accelerate scrolling though menu items when a user indicates that she needs to navigate through the menu items faster. For example, if a user depresses a navigation key on a remote control device with a greater force or depresses a navigation key on a remote control device for a certain period of time, the speed of scrolling through menu items may be automatically increased. Throttled list scrolling techniques may be used advantageously where a menu panel has a large number of menu items, such as where the menu items correspond to 400 television channels available to a user, to allow the user to quickly access the desired content item. Commitment-based GUI may include a so called action panel, which is a menu panel that provides a user with a selection of actions that may be performed with respect to a content item. Some example actions may include playing the selected content item, recording, deleting, sharing, saving, rating, searching for related content items, etc., as illustrated in FIG. 6.

Commitment-based GUI may be utilized beneficially in the context of a network environment. FIG. 1 illustrates an environment 100 within which an example commitment-based GUI may be implemented. The environment 100 includes a set top box 110 in communication with an entertainment display device 120 and a control device 130. The set-top box (STB) 110 may be a device that connects to a television and an external source of signal, turning the signal into content which can then be displayed on the television screen. In one example embodiment, the entertainment display device 120 is a television set, and the control device 130 is a remote control device that may be used for switching between television channels, for example. The set-top box 110 may be configured to include a system 112 to provide a commitment-based GUI that may include features outlined above. The set-top box 110 may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. Content, in this context, could mean any or all of video, audio, Internet web pages, interactive games, or other possibilities. As shown in FIG. 1, the set-top box 110 is shown as having access to signal sources 140, including broadcast programming 142, video on demand programs 144, as well as to local content 146 and Internet content 148.

As mentioned above, an example commitment-based GUI may be provided in the form of a multi-panel menu structure. The presentation of the menu structure to a user may be influenced by a perceived commitment of the user to navigating the menu structure, wherein the menu panels and the menu items appear more prominently on the associated display screen as the perceived commitment increases. An example system to provide commitment-based GUI may be described with reference to FIG. 2.

Figure 2:
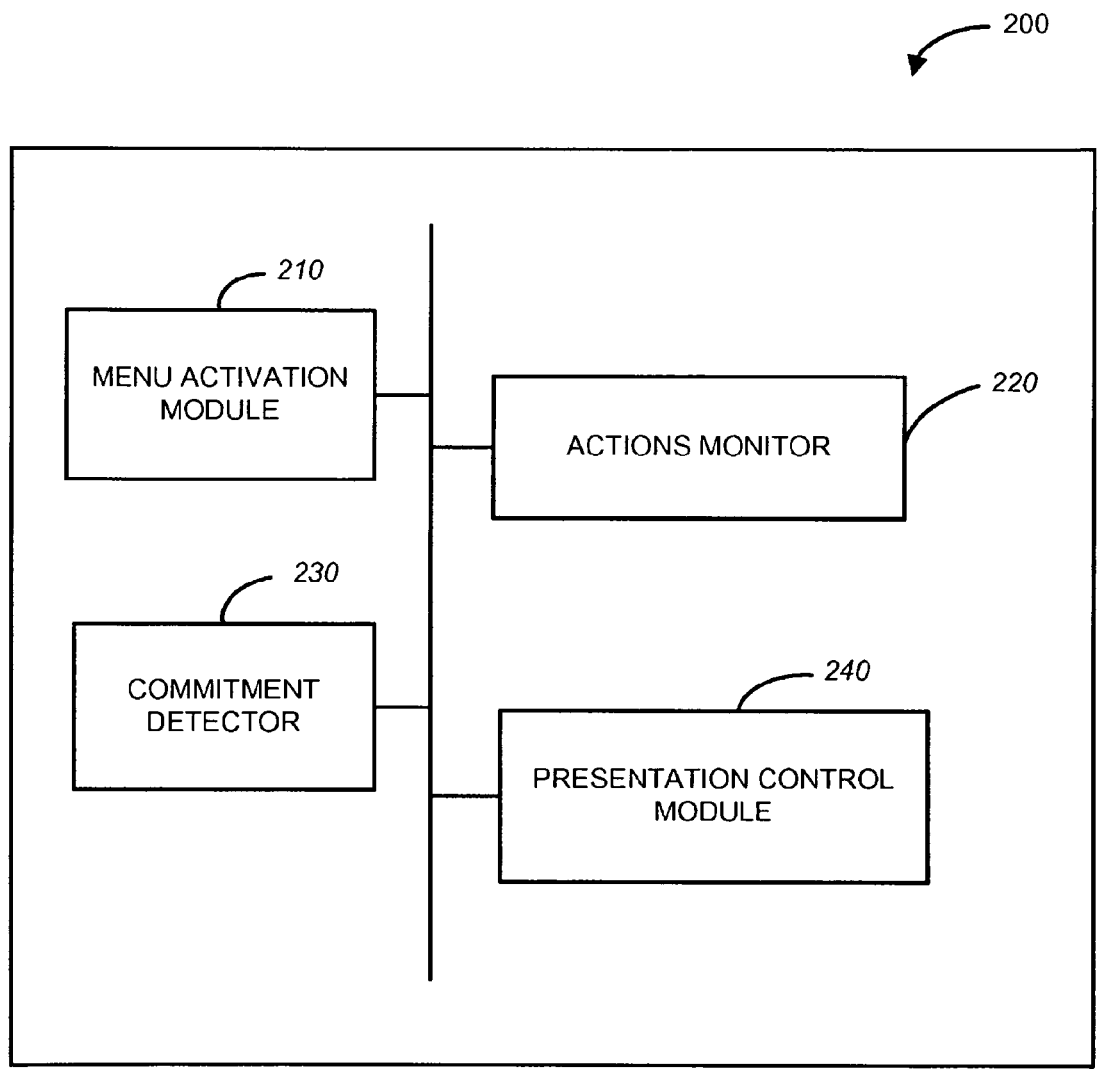
FIG. 2 is a block diagram illustrating a system to provide a commitment-based GUI, in accordance with an example embodiment, to navigate viewable content.

FIG. 2 illustrates an example system 200 to provide commitment-based GUI. The system 200 includes a menu activation module 210, an actions monitor 220, a commitment detector 230, and a presentation control module 240. The menu activation module 210 may be configured to activate the commitment-based GUI. In one embodiment, as discussed in more detail below, the commitment-based GUI may include hierarchically structured menu panels and may thus be referred to as a multi-panel media interface. Such multi-panel media interface may be activated, e.g., in response to a command received by the set top box 110 from the remote control device 130 of FIG. 1. When the multi-panel media interface is activated, a user is presented with a main menu panel that appears at the left-hand margin of a display area on the display device 120 of FIG. 1. The actions monitor 220 may be configured to monitor actions of the user with respect to the menu panels presented by the commitment-based GUI in order to collect information that may be then used by other modules of the system 200 to fine-tune presentation of the one or more of the menu panels associated with the multi-panel media interface. For example, as mentioned above and is described in further detail below, if a user does not navigate away from a certain menu item, this state is detected by the actions monitor 220, and the associated information (e.g., the duration of viewing of the menu item) may be used to determine that the user should be presented with a preview of a next level menu panel or the associated metadata related to the menu item. Information collected by the actions monitor 220 may also be used by the commitment detector 230.

The commitment detector 230 may be configured to determine a commitment level of a user to navigating the menu structure as opposed to watching the main content. This determination may be based on and may be expressed by a value indicating, e.g., how long the user had been viewing the menu items, as well as how deep in the menu structure has the user navigated. The determined commitment level may be then used by the presentation control module 240. The presentation control module 240 may be configured to adjust presentation of the menus provided by the multi-panel media interface based on the commitment level of the user. Example operations performed by the system 200 may be described with reference to FIG. 3.

Figure 3:
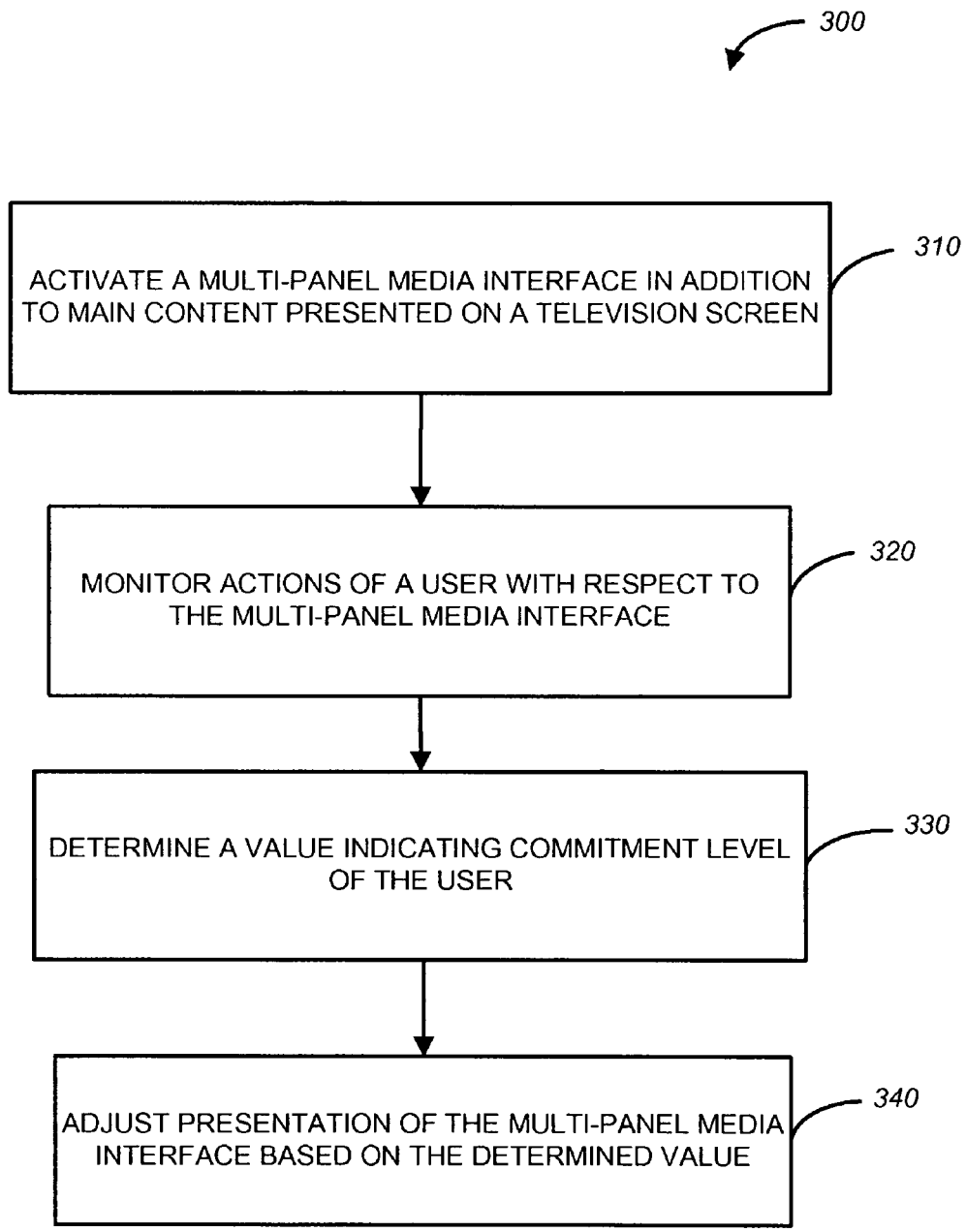
FIG. 3 is a flow chart illustrating a method for providing a commitment-based GUI, in accordance with an example embodiment, to present a GUI based on commitment level of a user.

FIG. 3 illustrates an example method 300 of providing a commitment-based GUI. The method 300 may be performed in the context of media and entertainment, e.g., in the context of television entertainment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 3, the method 300 commences with operation 310, where the menu activation module 210 of FIG. 2 activates a multi panel media interface e.g., in response to a command issued by a user from a remote control device. At operation 320, the actions monitor 320 of FIG. 2 commences monitoring of activity of the user with respect to the multi panel media interface. At operation 330, the commitment detector 230 of FIG. 2 determines a level of commitment of the user with respect to navigating the menu structure. In one embodiment, the commitment detector 230 may determine a value that reflects a commitment level of the user, e.g., the value associated with the duration or the depth of the user's navigating the menu structure.

The presentation control module 240 of FIG. 2 adjusts presentation of the multi panel media interface based on the determined level of commitment. For example, a menu panel that correspond to a menu item that has not been actively selected by a user but is expected to be of interest to the user may be presented in a semi-transparent fashion to give the user a preview of menu items available at the next menu level. If the commitment detector 230 determines that the user has not navigated away from a current presentation of the multi panel media interface for a predetermined period of time, the presentation control module 240 may adjust presentation of the menu panels such that the menu panel associated with the next menu level becomes more opaque. Example visual presentations of various features of the multi panel commitment-based media interface are provided in FIGS. 4-8.

Figure 4:
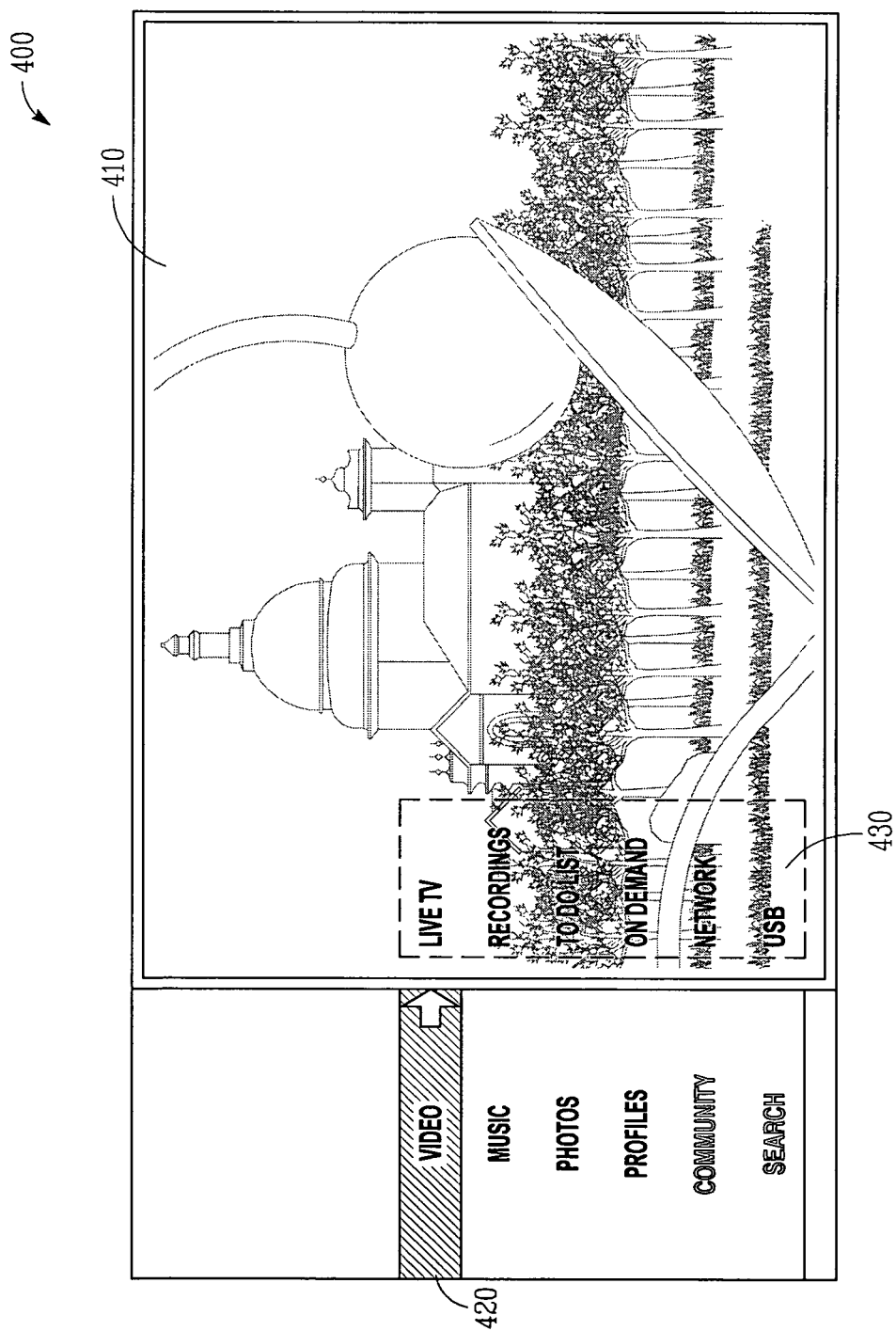
FIGS. 4-8 show presentations of a multi-panel media interface, in accordance with an example embodiment.

An example presentation interface showing the first level of the menu structure associated with commitment-based GUI is illustrated in FIG. 4. As shown in FIG. 4, a presentation area 400 comprises area 410 that includes a main content. The main content may be a television program, previously recorded content, an Internet web page, a locally stored digital photo, etc. Area 420 includes the first level menu (or the main menu) that permits a user to select a type of content (e.g., video, music, or images), to participate in the community (e.g., by rating content, or providing recommendations to others), to search for content, etc. As mentioned above, commitment-based GUI enables viewers to easily access content. The navigational paradigm uses a consistent navigation model, whereby pressing the right arrow key on a control device always moves the menu presentation forward a level and the left arrow key on the control device always moves the menu presentation back a level. As shown in FIG. 4, the focus is clearly denoted by the white bar. Specifically, in the area 420, the "VIDEO" menu item appears on a white background and is vertically centered in the presentation area 400. Shown to the right of the main menu, in area 430, is a so called hover focus, which provides a semi-transparent hint of the next level menu panel.

As mentioned above, the right and left directional arrow keys may be used to navigate horizontally between menu panels. A menu item (or an option) may be associated with a specific menu panel that expands and retracts in line with the depth of the available menu options or based on additional information. The up and down arrow keys on a remote control device may be used to vertically scroll and navigate content within a menu panel. As the vertical menu panel focus changes, so does the presented hover focus.

Figure 5:
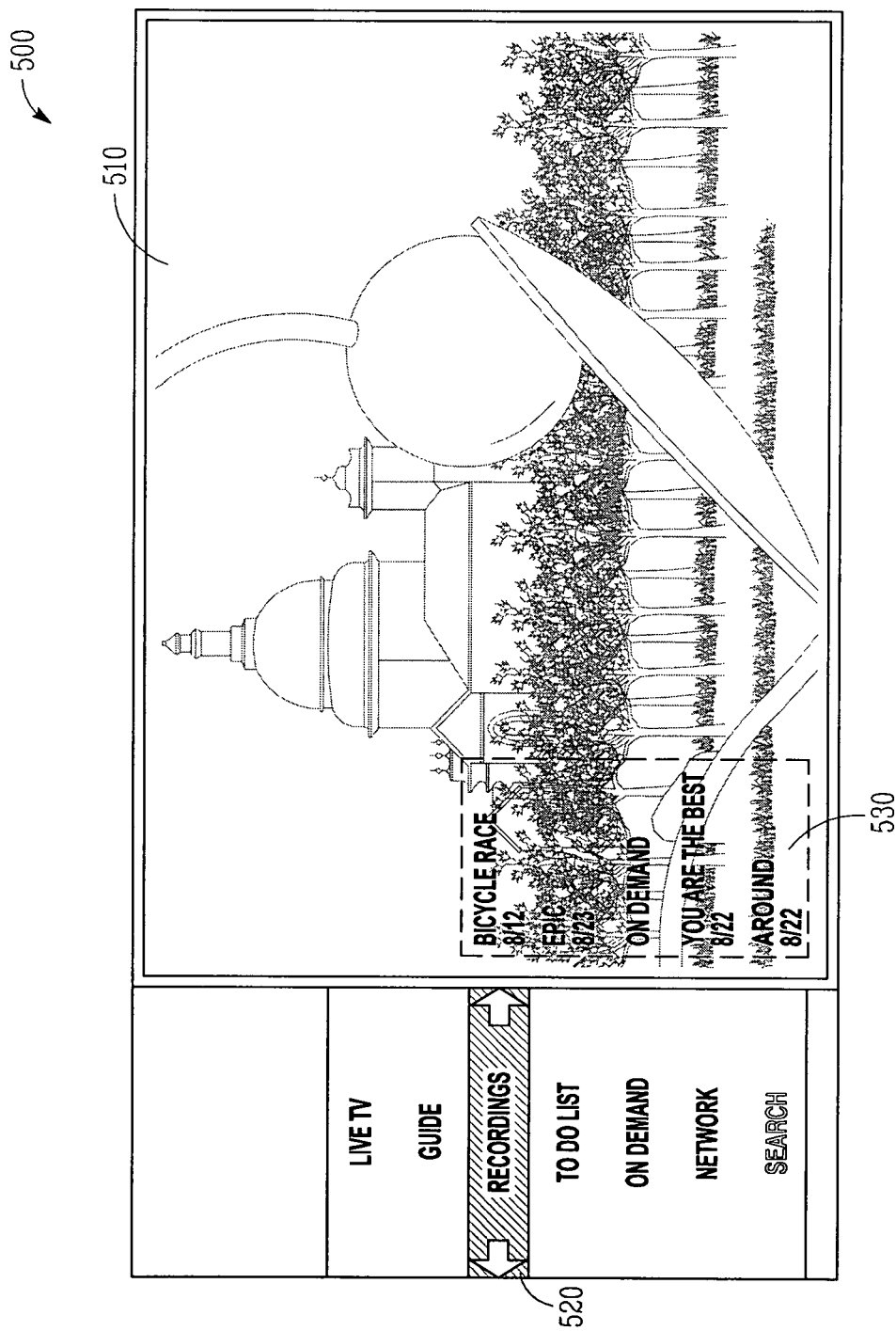

As shown in FIG. 5, the "Video" menu item that appeared in focus in the area 420 in FIG. 4 has been expanded (in response to a user selecting the right arrow key on a remote control device) and the "RECORDINGS" menu item in area 520 has been put in focus (in response to a user selecting the down arrow key on the remote control device). In the area 520, the "RECORDINGS" menu item appears on a white background and is vertically centered in the presentation area 500. The hover focus associated with the "RECORDINGS" menu item appears in area 530. The hover focus provides a hint of the next level of menu options—here, the list of available recordings. The hover focus is displayed when the viewer commits to the menu option in focus, e.g., by not navigating away from the menu displayed in the area 420 for more than 3 seconds. The main content is still displayed in area 510.

FIG. 6 illustrates an expanded multi-panel media interface presented in a presentation area 600. In this example, the viewer has chosen to select the menu item titled "Bicycle Race"—referenced in the hover focus in the area 530 of FIG. 5—by pressing the right arrow key on a remote control device. As a result, the user's commitment metric to this navigational route extends, which causes the increased amount of relevant information to be displayed. As shown in FIG. 6, the titles displayed in the hover focus in the area 530 of FIG. 5 are presented in area 620 of FIG. 6. The "Bicycle Race" menu item appears on a white background and is vertically centered in the presentation area 600. As the viewer navigates further into the menu structure, the depth may be denoted by a layered z-order of condensed panels (e.g., at the far left of the screen). The condensed panels may be differentiated by the level of opacity assigned (not shown).

The hover focus that appears in area 630 when a specific menu item is selected appears in area 620 is a so called action panel. As shown in FIG. 6, the hover focus presented in the area 630 is a panel menu with its own interdependent hover preview in area 640. An action panel may be employed to permit a user to access various actionable functionality associated with the selected content. Example action menu items and the associated functionality is listed below PLAY—play the recorded content.
DELETE—delete the recorded content.
KEEP—protect the content from being deleted.
RATE—rate the content.
EXPORT—transferring content to external device.
SHARE—share content recommendation.

The action panel displayed in the area 630 and the hover preview displayed in the area 640 together may be referred to as a media panel. In one example embodiment, the commitment-based GUI presents the viewer with a picture-in-picture hover preview of the content along with a synopsis, as can be seen in the area 640. This additional information may be progressively revealed in line with the user's determined commitment level with respect to navigating the menu structure.

When the presentation 600 is available to the viewer, as shown in FIG. 6, the viewer is also able to activate a rating selector via the media panel by navigating to the "RATE" menu item in the area 630 and then pressing the right arrow key. The viewer can then select the number of stars to be associated with their rating of the content. Once the content (here, the "Bicycle Race") is rated, the rating data may be aggregated either globally or locally. Globally aggregated ratings may then be added to a global list accessible via the multi-panel menu structure, depicting the most recommended shows from all participating viewers. A viewer can choose to record, rate or simply get more information regarding a global recommendation or rating.

Figure 7:
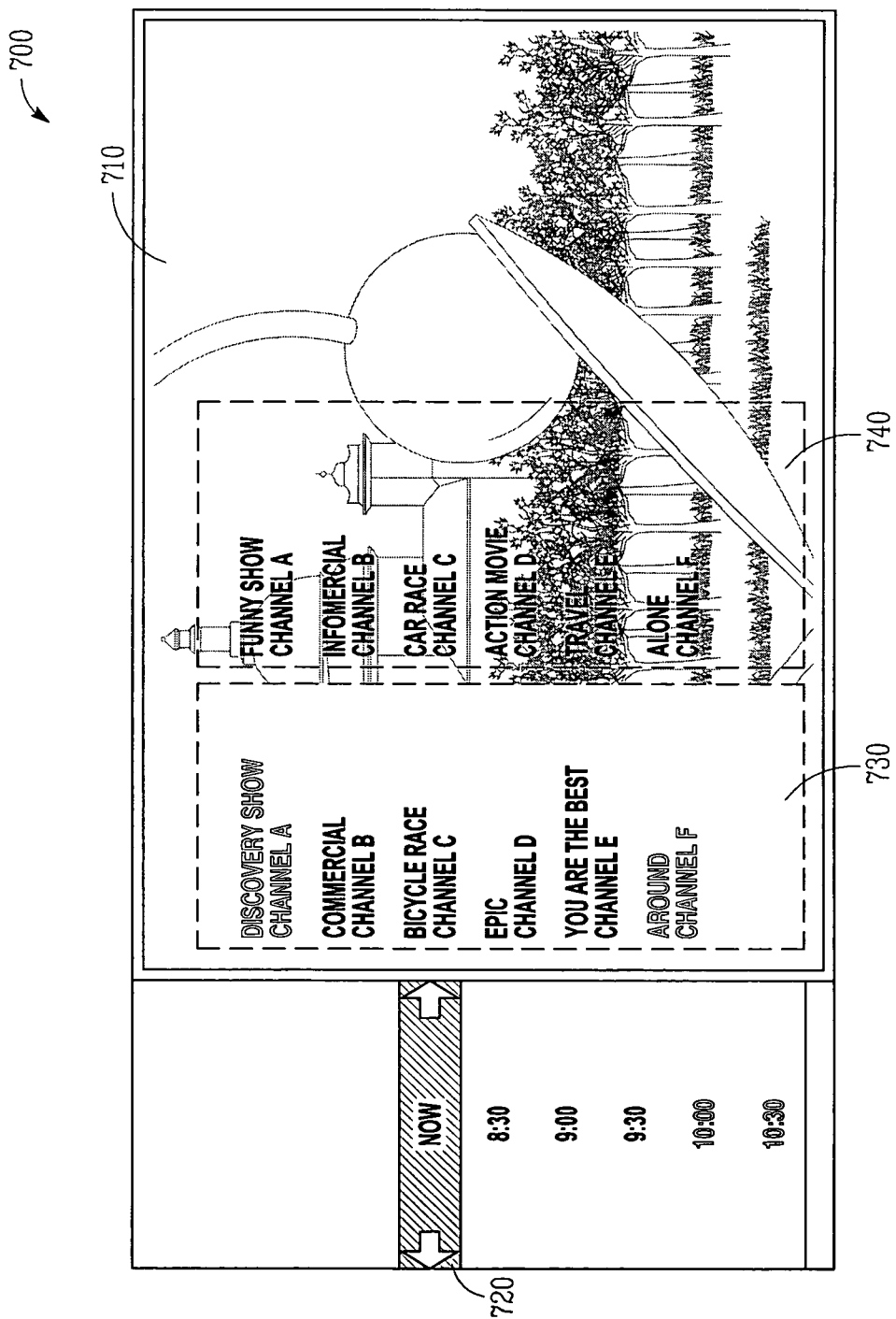

FIG. 7 illustrates another example of an expanded multi-panel media interface. Shown in the presentation area 700 is the multi-panel interface design for live television (TV) content. A time panel is shown in area 720 on the left-hand-side of the presentation area 700, while the main content appears in area 710. The time panel allows to navigate vertically between different time slots, which permits a viewer to quickly view time-specific television program listings. The programs that are playing now are listed in area 730. The programs that are scheduled to play during the next time slot are listed as a hover menu in area 740.

Figure 8:
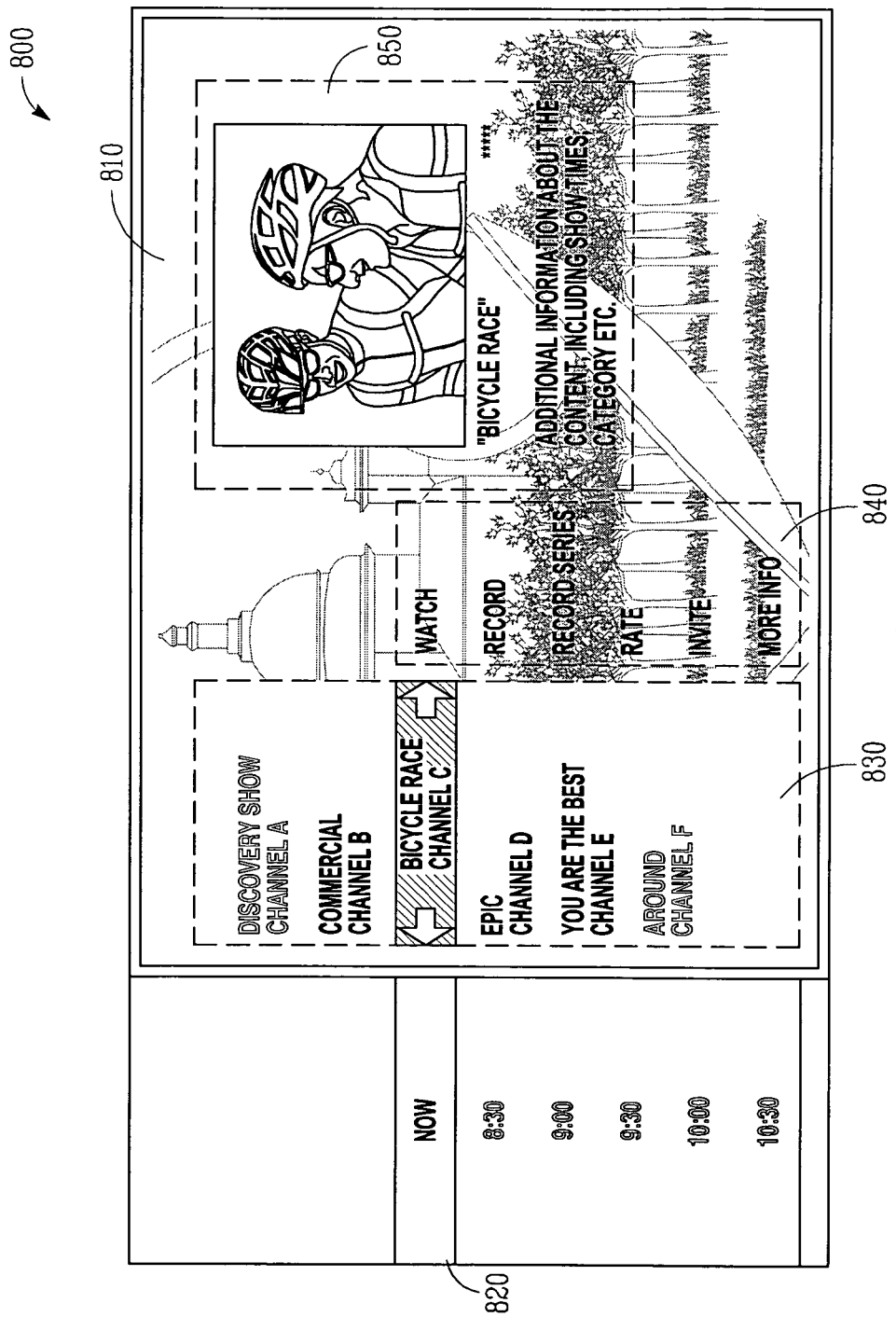

FIG. 8 illustrates presentation area 800 where a viewer selected a particular content item, "Bicycle Race," from the menu panel in area 830. A time panel is shown in area 820, while the main content appears in area 810. The selection of a specific content item may be effectuated by pressing the right arrow key on a remote control device. The viewer may then quickly navigate vertically through an extensive amount of content, e.g., using throttled list scrolling. In response to detecting a selection of a content item by a user, the multi-panel media interface may present an associated action panel shown in area 840, as well as a hover preview of the selected content item (shown in area 850).

Figure 9:
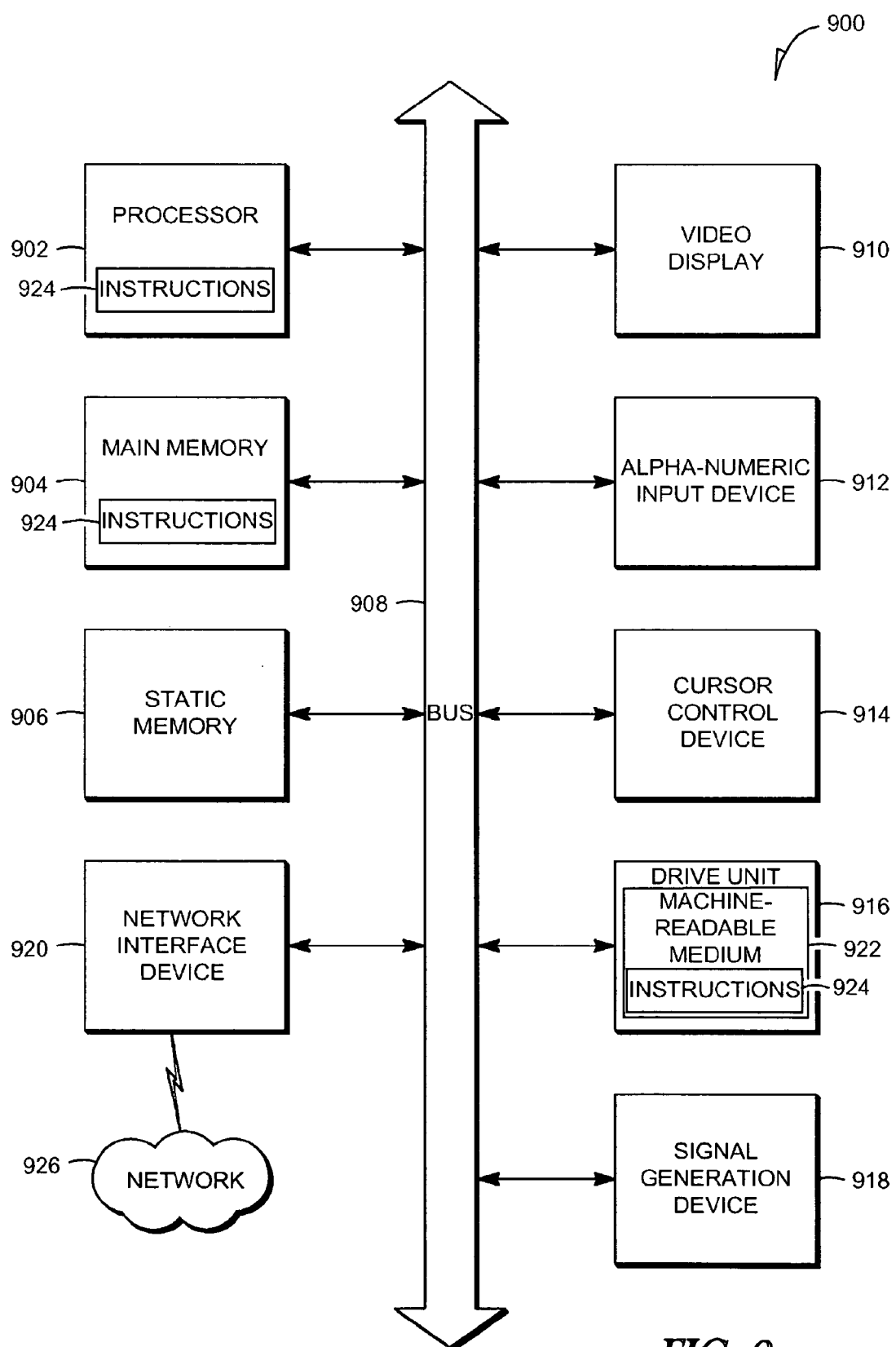
FIG. 9 illustrates a diagrammatic representation of a machine in the example form of a computer system within which a set of instructions, for causing the machine to perform any one or more of the methodologies discussed herein, may be executed.

FIG. 9 shows a diagrammatic representation of machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a real or virtual keyboard), a viewer interface (UI) navigation device 914 (e.g., a remote control or a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904, within the processor 902 during execution thereof by the computer system 900, the main memory 904 and the processor 902 also constituting machine-readable media. The main memory 904 comprises storage locations that are addressable by the processor 902 for storing software program code. The memory may comprise a form of random access memory (RAM). Those skilled in the art will appreciate that other memory means, such as FLASH memory media, may also be used for storing the program instructions and data structures shown in the main memory 904.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, a content based GUI that permits navigating content available for viewing (e.g., satellite content, cable content, mobile telephony content, IPTV content, and the like) and to manage a viewer's choice have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any viewer of the system to navigate television content.

The invention claimed is:

1. A computer-implemented method comprising:
 activating a multi-panel media interface on a display device displaying main content in a main content area, the multi-panel media interface comprising a menu structure to present one or more menu panels;
 presenting a first level menu panel in a margin of a display area adjacent to the main content area, the first level menu panel being a time panel comprising a plurality of time slots;
 detecting, focus by a user, on a menu item of the first level menu panel that corresponds to a time slot of the plurality of time slots;
 in response to the detected focus, presenting a second level menu panel indicating a plurality of content that is viewable during the time slot, the second level menu panel presented adjacent to the first level menu panel in the menu area and over a portion of the main content area;

presenting a hover panel adjacent to the second level menu panel, the hover panel being semi-transparent and indicating a plurality of content available during a next time slot;

monitoring activity of the user with respect to the multi-panel media interface while the main content is being presented in the main content area on the display device;

determining a value indicating a commitment level of the user to navigating the menu structure associated with the multi-panel media interface as opposed to viewing the main content being presented in the main content area;

adjusting presentation of the multi-panel media interface on the display device based on the determined value indicating the commitment level, the adjusting of the presentation of the multi-panel media interface comprising modifying of the menu panel that is a preview of a next menu level from semi-transparent to opaque based on the user staying on a current presentation of the multi panel media interface for a predetermined period of time; and receiving a selection of content from the plurality of content, the selection causing the hover panel to change to indicate actions available for the selected content.

2. The method of claim 1, wherein the value indicating a commitment level of the user reflects a current depth of navigation into the menu structure.

3. The method of claim 1,
wherein the value indicating a commitment level of the user reflects duration of navigation into the menu structure.

4. The method of claim 1, wherein the adjusting of the presentation of the multi-panel media interface comprises modifying font associated with text in at least a portion of a menu panel from the one or more menu panels.

5. The method of claim 1, further comprising:
placing the menu item in focus vertically, such that the menu item in focus is vertically centered on a display screen.

6. The method of claim 1, further comprising:
detecting an indication for throttled scrolling; and
responding to the indication by modifying a speed of scrolling through menu items presented by the multi panel media interface.

7. The method of claim 6, wherein the indication for throttled scrolling is associated with the amount of pressure applied to a key on a remote control device.

8. The method of claim 6, wherein the indication for throttled scrolling is associated with the amount of time a key on a remote control device was held down.

9. The method of claim 1, wherein the adjusting of the presentation of the multi-panel media interface comprises presenting each next layer in a menu structure of the multi-panel media interface as taking up a larger portion of a display area on the display device.

10. The method of claim 1, further comprising:
receiving a selection of content from the second level menu panel; and
in response to the selection of the content, presenting an associated action panel the associated action panel comprising actions performable on the selected content.

11. A system comprising:
a memory;
one or more processors coupled to the memory for executing instructions; a menu activation module to activate, using at least one processor, a multi-panel media interface on a display device displaying main content in a main content area, the multi-panel media interface to present one or more menu panels, an actions monitor to monitor, using at least one processor, activity of a user with respect to the multi-panel media interface while the main content is being presented in the main content area on the display device, a commitment detector to determine, using at least one processor, a value indicating a commitment level of the user, the commitment level indicating the user's interest level in navigating a menu structure associated with the multi-panel media interface as opposed to viewing the main content being presented in the main content area, and a presentation control module to;

present a first level menu panel in a margin of a display area adjacent to the main content area, the first level menu panel being a time panel comprising a plurality of time slots, in response to a detected focus by the user on a menu item of the first level menu panel that corresponds to a time slot of the plurality of time slots, present a second level menu panel indicating a plurality of content that is viewable during the time slot the second level menu panel presented adjacent to the first level menu panel in the menu area and over a portion of the main content area, present a hover panel adjacent to the second level menu panel the hover panel indicating a plurality of content available during a next time slot, and adjust, using at least one processor, presentation of the multi-panel media interface on the display device based on the determined value indicating the commitment level, the adjusting of the presentation of the multi-panel media interface comprising modifying of the menu panel that is a preview of a next menu level from semi-transparent to opaque based on the user staying on a current presentation of the multi panel media interface for a predetermined period of time; and receiving a selection of content from the plurality of content, the selection causing the hover panel to change to indicate actions available for the selected content.

12. The system of claim 11, wherein the value indicating a commitment level of the user reflects a current depth of navigation into the menu structure.

13. The system of claim 11, wherein the value indicating a commitment level of the user reflects duration of navigation into the menu structure.

14. The system of claim 11, wherein the presentation control module is to modify the amount of information presented by the multi-panel media interface based on the determined commitment level.

15. The system of claim 11, wherein:
the actions monitor is to detect a selection of content from the second level menu panel; and
in response to the selection of the content, the presentation control module is to present an associated action panel the associated action panel comprising actions performable on the selected content.

16. The system of claim 15, wherein the selection is effectuated by using a key on a remote control device.

17. The system of claim 11, wherein the display device is a television.

18. The system of claim 11 wherein the menu activation module, the actions monitor, the commitment detector, and the presentation control module are provided at a set top box.

19. The system of claim 15, wherein the presentation control module is to further present a hover preview of the selected content adjacent to the associated action panel.

20. A non-transitory machine-readable storage medium having instruction that, when executed by one or more processors of a machine, cause the machine to perform operations comprising:
- activating a multi-panel media interface on a display device displaying main content in a main content area, the multi-panel media interface comprising a menu structure to present one or more menu panels;
- presenting a first level menu panel in a margin of a display area adjacent to the main content area, the first level menu panel being a time panel comprising a plurality of time slots;
- detecting focus by a user on a menu item of the first level menu panel that corresponds to a time slot of the plurality of time slots;
- in response to the detected focus, presenting a second level menu panel indicating a plurality of content that is viewable during the time slot, the second level menu panel presented adjacent to the first level menu panel in the menu area and over a portion of the main content area;
- presenting a hover panel adjacent to the second level menu panel, the hover panel indicating a plurality of content available during a next time slot;
- monitoring activity of the user with respect to the multi-panel media interface while the main content is being presented in the main content area on the display device;
- determining a value indicating a commitment level of the user to navigating the menu structure associated with the multi-panel media interface as opposed to viewing the main content being presented in the main area; and
- adjusting presentation of the multi-panel media interface on the display device based on the determined value indicating the commitment level, the adjusting of the presentation of the multi-panel media interface comprising modifying of the menu panel that is a preview of a next menu level from semi-transparent to opaque based on the user staying on a current presentation of the multi panel media interface for a predetermined period of time; and
- receiving a selection of content from the plurality of content, the selection causing the hover panel to change to indicate actions available for the selected content.

21. The non-transitory machine-readable storage medium of claim 20, wherein the operations further comprise:
- receiving a selection content from the second level menu panel; and
- in response to the selection of content, presenting an associated action panel the associated action panel comprising actions performable on the selected content.

22. The method of claim 10, further comprising presenting a hover preview of the selected content adjacent to the associated action panel.

* * * * *

UNITED STATES PATENT AND TRADEMARK OFFICE
CERTIFICATE OF CORRECTION

PATENT NO. : 9,733,818 B2
APPLICATION NO. : 12/283427
DATED : August 15, 2017
INVENTOR(S) : Chai et al.

It is certified that error appears in the above-identified patent and that said Letters Patent is hereby corrected as shown below:

In the Claims

In Column 9, Line 21, in Claim 1, delete "multi panel" and insert --multi-panel-- therefor In Column 9, Line 44-45, in Claim 6, delete "multi panel" and insert --multi-panel-- therefor In Column 9, Line 67, in Claim 11, after "instructions;", insert --¶--

In Column 10, Line 38, in Claim 11, delete "multi panel" and insert --multi-panel-- therefor In Column 12, Line 12, in Claim 20, delete "multi panel" and insert --multi-panel-- therefor Signed and Sealed this
Fourteenth Day of April, 2020

Andrei Iancu
*Director of the United States Patent and Trademark Office*